(12) United States Patent
François et al.

(10) Patent No.: US 9,083,930 B2
(45) Date of Patent: Jul. 14, 2015

(54) HIGH-DYNAMICS IMAGE TRANSMISSION SYSTEM, ENCODING AND DECODING UNITS AND METHODS THEREFOR

(75) Inventors: Edouard François, Bourg des Comptes (FR); Jérôme Vieron, Bedee (FR); Laurent Blonde, Thorigne-Fouillard (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 1069 days.

(21) Appl. No.: 12/085,256

(22) PCT Filed: Nov. 20, 2006

(86) PCT No.: PCT/FR2006/002546
§ 371 (c)(1),
(2), (4) Date: May 20, 2008

(87) PCT Pub. No.: WO2007/060316
PCT Pub. Date: May 31, 2007

(65) Prior Publication Data
US 2009/0135904 A1    May 28, 2009

(30) Foreign Application Priority Data
Nov. 21, 2005    (FR) ...................................... 05 11761

(51) Int. Cl.
*H04N 7/26* (2006.01)
*H04N 5/74* (2006.01)

(52) U.S. Cl.
CPC ...................................... *H04N 5/74* (2013.01)

(58) Field of Classification Search
CPC ............................................... H04N 19/00981
USPC ...................................... 375/240.01, 240.08
IPC ......................................................... H04N 7/26
See application file for complete search history.

(56) References Cited

U.S. PATENT DOCUMENTS

| 6,205,252 B1 | 3/2001 | Nguyen et al. |
| 6,683,657 B1 | 1/2004 | Miyawaki |

(Continued)

FOREIGN PATENT DOCUMENTS

| JP | 6209469 | 7/1994 |
| JP | 2000049619 | 2/2000 |

(Continued)

OTHER PUBLICATIONS

Patent Abstracts of Japan, vol. 2002, No. 08, Aug. 5, 2002 & JP 2002-099250 (Toshiba Corp).

(Continued)

*Primary Examiner* — Jay Patel
*Assistant Examiner* — Yulin Sun
(74) *Attorney, Agent, or Firm* — Tutunjian & Bitetto, P.C.

(57) ABSTRACT

A high dynamic picture transmission system is provided. The transmission system includes a coding unit configured to generate a standard bitstream and at least a second bitstream. The standard bitstream coding the pictures such that the luminance of each pixel is coded with a standard dynamic, and the second bitstream contains the information necessary to reconstruct the luminance of high dynamic pictures from the coded luminance with the standard dynamic contained in the standard bitstream.

7 Claims, 4 Drawing Sheets

(56) References Cited

U.S. PATENT DOCUMENTS

Figure 1:
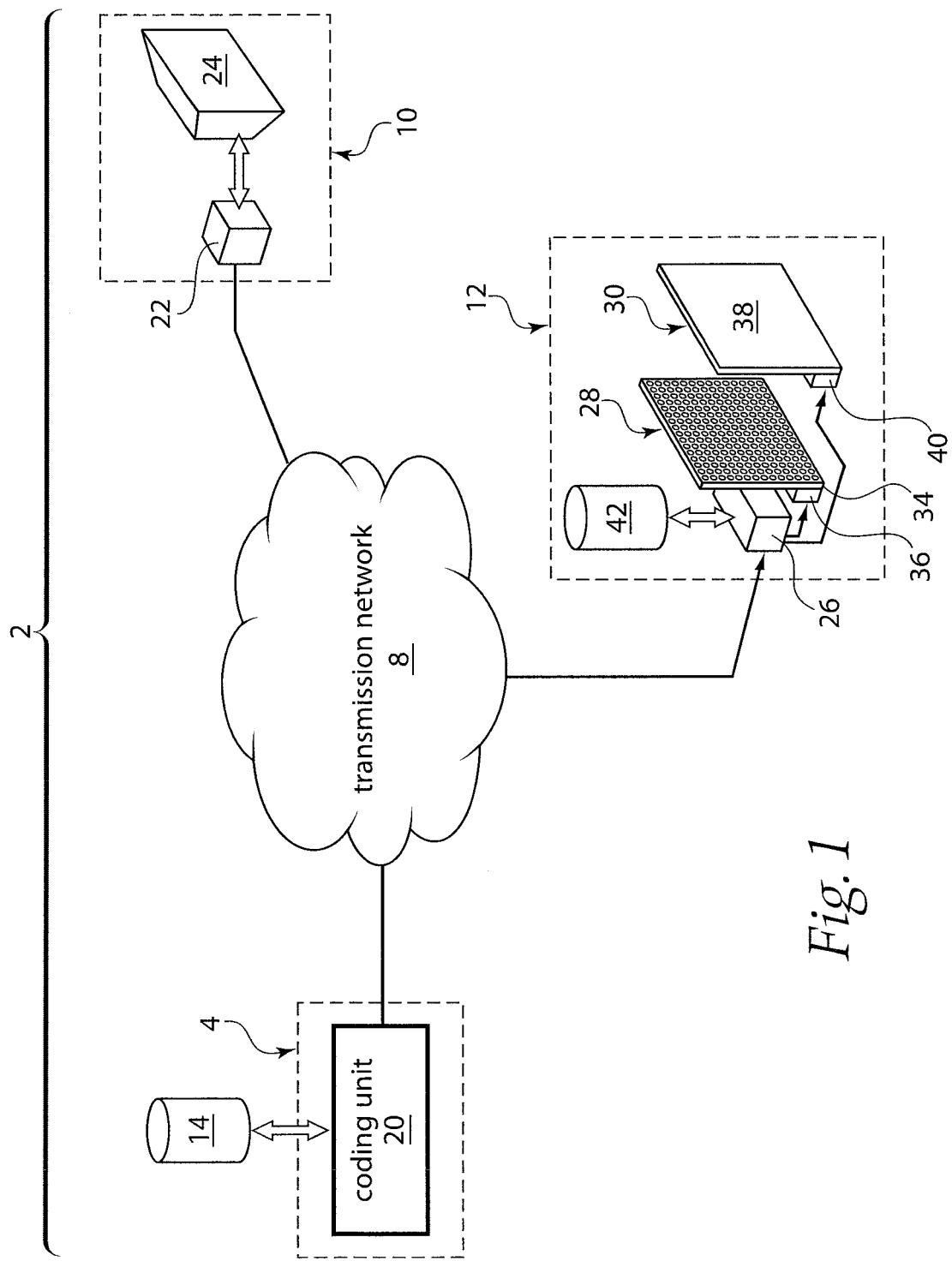

| | | | |
|---|---|---|---|
| 2002/0105621 | A1 | 8/2002 | Kurematsu |
| 2002/0181580 | A1 | 12/2002 | Van Der Schaar |
| 2003/0048393 | A1 | 3/2003 | Sayag |
| 2004/0126113 | A1* | 7/2004 | Johnson et al. ............... 398/58 |
| 2004/0201731 | A1 | 10/2004 | Kakinuma et al. |
| 2005/0147317 | A1* | 7/2005 | Daly et al. .................. 382/264 |
| 2005/0157366 | A1 | 7/2005 | Asahi et al. |
| 2005/0190140 | A1 | 9/2005 | Asahi et al. |
| 2005/0259729 | A1* | 11/2005 | Sun ........................... 375/240.1 |
| 2006/0103621 | A1* | 5/2006 | Feng ............................ 345/102 |
| 2010/0172411 | A1* | 7/2010 | Efremov et al. ......... 375/240.12 |

FOREIGN PATENT DOCUMENTS

| | | |
|---|---|---|
| JP | 2001100699 | 4/2001 |
| JP | 2002-099250 | 4/2002 |
| JP | 2002099250 | 4/2002 |
| JP | 2002214697 | 7/2002 |
| JP | 2003101788 | 4/2003 |
| JP | 2004015226 | 1/2004 |
| WO | WO0205564 | 1/2002 |
| WO | WO02069030 | 9/2002 |
| WO | WO03077013 | 9/2003 |
| WO | WO2005104035 | 11/2005 |

OTHER PUBLICATIONS

Helge Seetzen et al.: "54.2: A High Dynamic Range Display Using Low and High Resolution Modulators" 2003 SID International Symposium, vol. XXXI4, May 20, 2003, pp. 1450-1453.

Search Report Dated Mar. 26, 2007.

Seetzen et al., "High Dynamic Range Display Systems", SIGGRAPH 04, Aug. 8, 2004, Los Angeles, California, USA, pp. 1-9.

Gao et al., "An efficient fine granularity scalable coding scheme using adaptive leaky prediction", Proceedings of the 2003 Joint Conference of the Fourth International Conference on Information, Communications and Signal Processing and Fourth Pacific-Rim Conference on Multimedia, Pt. vol. 1, Dec. 15, 2003, pp. 582-586.

Mayer et al., "Bit plane quantization for scalable video coding", Inst. for Commun Eng.; Proceedings of the SPIE—the international Society for Optical Engineering, vol. 4671, pt.1-2, 2002, pp. 1142-1152.

Smirnov, M., "Efficient multicast routing in high speed networks", Computer Communications, vol. 19, No. 1, Jan. 1996, pp. 59-75.

Mens et al., "Photoelectron current saturation in streak tubes used for high-dynamic-range measurements on inertial confinement fusion lasers", Proceedings of the SPIE—the International Society for Optical Engineering, vol. 5869, 1997, pp. 139-148.

ISO-IEC-14496-2, "Information technology—Coding of audio-visual objects—Part 2: Visual", Dec. 1, 2001, pp. 1-536.

* cited by examiner

HIGH-DYNAMICS IMAGE TRANSMISSION SYSTEM, ENCODING AND DECODING UNITS AND METHODS THEREFOR

This application claims the benefit, under 35 U.S.C. §365 of International Application PCT/FR2006/002546, filed on Nov. 20, 2006, which was published in accordance with PCT Article 21(2) on May 31, 2007 in French and which claims the benefit of French patent application No. 0511761, filed on Nov. 21, 2005.

The present invention relates to a high dynamic picture transmission system, coding and decoding units and methods for this system.

The dynamics of a picture correspond to the number of bits required to code the luminance of each pixel of said picture "Standard dynamic receiver" designates receivers that can display at most $2^n$ level of luminance, where n is a whole number typically less than or equal to eight.

A high dynamic picture receiver is a receiver that can display at least $2^m$ levels of luminance, where m is a whole number greater than or equal to ten.

"High dynamic picture" also designates a picture where the luminance of the pixels is coded at m bits. A "standard dynamic picture" typically has a luminance coded over more than n bits.

The high dynamic picture receivers for example, are described in the following A1 article:
H. Seetzen, W. Heidrich, W. Stuerzlinger, G. Ward, L. Whitehead, M. Trentacoste, A. Ghosh, A. Vorozcovs, "High dynamic range display system", to be published at SIGGRAPH 04, 8-12 Aug. 4, Los Angeles, USA.

It is therefore preferable to realize transmission systems of high dynamic initial digital pictures comprising:
- at least one high dynamic picture receiver equipped with a HDR (High Dynamic Range) screen formed from a pixel matrix, the luminance of each pixel being able to be adjusted to account for any level from among at least $2^m$ possible levels,
- at least one standard dynamic picture receiver equipped with a screen formed from a pixel matrix, being able to adjust the luminance of each pixel only to account for any level from among at least $2^n$ possible levels, where n is a whole number strictly less than m, and
- a transmitter comprising a specific coding unit able to generate bitstreams coding the initial pictures, this transmitter being capable of transmitting these bitstreams to all receivers.

A digital picture can be seen as a three dimensional matrix in which the first two coordinates X, Y represent, for example, the position of the pixel in the picture and the third coordinate its level of luminance. When a video film is involved, a fourth dimension representing time can be added to this matrix. These matrices cannot be transmitted as they are to the picture receivers.

Typically, the digital pictures are coded to be converted into bitstreams that are transmitted to each of the receivers. A bitstream is a temporal succession of bits. Such coding notably allows the compression of the pictures and reduction of the number of bits necessary to transmit the pictures to the receivers.

To date, a standard dynamic picture receiver is not capable to directly display a bitstream coding a high dynamic picture. Indeed, for the display of a high dynamic picture to be possible, the levels of luminance coded for this picture must be truncated in order to correspond to the levels of luminance that can be displayed on the receiver. Such a modification of the standard dynamic picture receivers would be fastidious and lengthy.

The invention aims to solve this problem by proposing a high dynamic picture transmission system in which the modifications to be applied to the standard dynamic picture receiver are lessened.

The purpose of the invention is therefore a transmission system of high dynamic initial digital pictures in which the coding unit is able to generate:
- a standard bitstream coding the initial pictures in which the luminance of each pixel of each initial picture is uniquely coded on at most n bits, and
- at least a second bitstream containing the additional information required to reconstruct the luminance coded on m bits of each pixel of each initial picture from the luminance coded on n bits contained in the standard bitstream.

In the above system, to display a picture coded in the standard bitstream, the standard dynamic picture receiver does not need to reduce the dynamic of the coded pictures. Hence, the amount of processing that this receiver must perform to display a high dynamic picture is reduced.

The second stream allows the high dynamic picture receiver to display the pictures by exploiting the full extent of its possible luminance range.

Hence, the above system allows high dynamic pictures to be transmitted to a heterogeneous set of picture receivers without requiring significant modification of the standard dynamic picture receivers. In addition, the quantity of information to transmit is reduced as it is no longer necessary to have the standard data specifically dedicated to standard dynamic receivers, and other high quality data specifically dedicated to high dynamic receivers, having a strong redundancy with standard data.

The embodiments of this system can comprise one or more of the following characteristics:
- the high dynamic picture receiver comprises a picture projector able to project a picture $I_{LED}$, an LCD (Liquid Crystal Display) display back-lit by the picture projector, this display displaying a picture $I_{LCD}$, and the second bitstream is a residual bitstream containing the differences in luminance between each pixel of the picture $I_{LCD}$ and each pixel corresponding to an estimation of picture $I_{LCD}$ obtained from the standard bitstream,
- the coding unit is able to generate a third bitstream coding the pictures $I_{LED}$ according to the standard bitstream.

These embodiments also have the following advantages:
- the emission of the residual bitstream is used to reduce the quantity of information to be transmitted in addition to the standard bitstream, and
- the coding of the bitstream coding the pictures $I_{LED}$ according to standard bitstream is also used to reduce the quantity of information to be transmitted in addition to the standard bitstream and simplifies the realization of high dynamic picture receivers.

The purpose of the invention is also a coding unit able to be implemented in the transmission system above.

The purpose of the invention is also a decoding unit of a high dynamic picture receiver able to be implemented in the transmission system above.

The embodiments of this decoding unit can comprise one or more of the following characteristics:
- the decoding unit is able using standard bitstream and at least the second bitstream, to reconstruct the coded luminance on m bits of each pixel of each initial picture using the luminance coded on n bits contained in the standard bitstream, the decoding unit is able to generate the picture $I_{LCD}$ from the residual bitstream and an estimation of the picture $I_{LCD}$ obtained from a standard bitstream, the decoding unit is able to reconstruct the picture $I_{LED}$ from a standard bitstream and a third bitstream coding the pictures $I_{LED}$ according to the standard bitstream.

The purpose of the invention is also a method of coding a high dynamic initial digital picture able to be implemented in the transmission system above.

The purpose of the invention is also a method of decoding a picture coded by means of the coding method above, said decoding method comprising a stage of reconstruction of the luminance coded on m bits from a standard bitstream and at least the second bitstream.

the embodiments of this decoding method can comprise the following characteristics:

a construction stage of a picture estimation $I_{LCD}$ from the standard bitstream and the residual bitstream.

Figure 2:
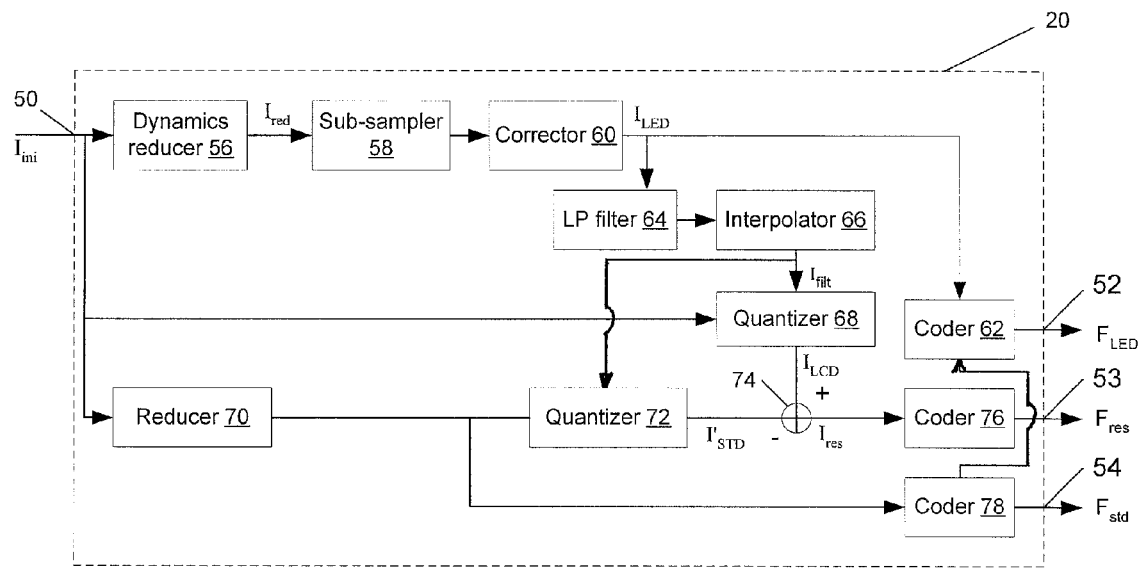
Figure 3:
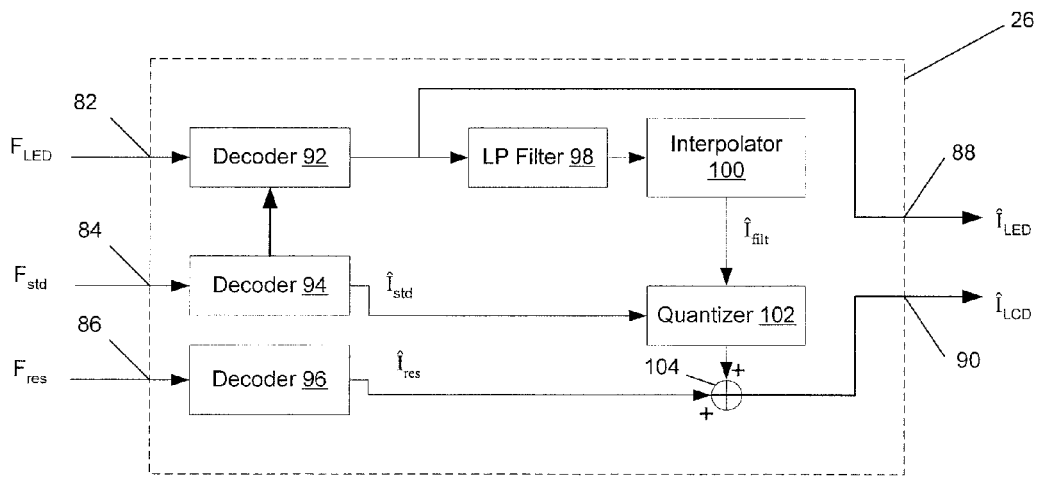
Figure 4:
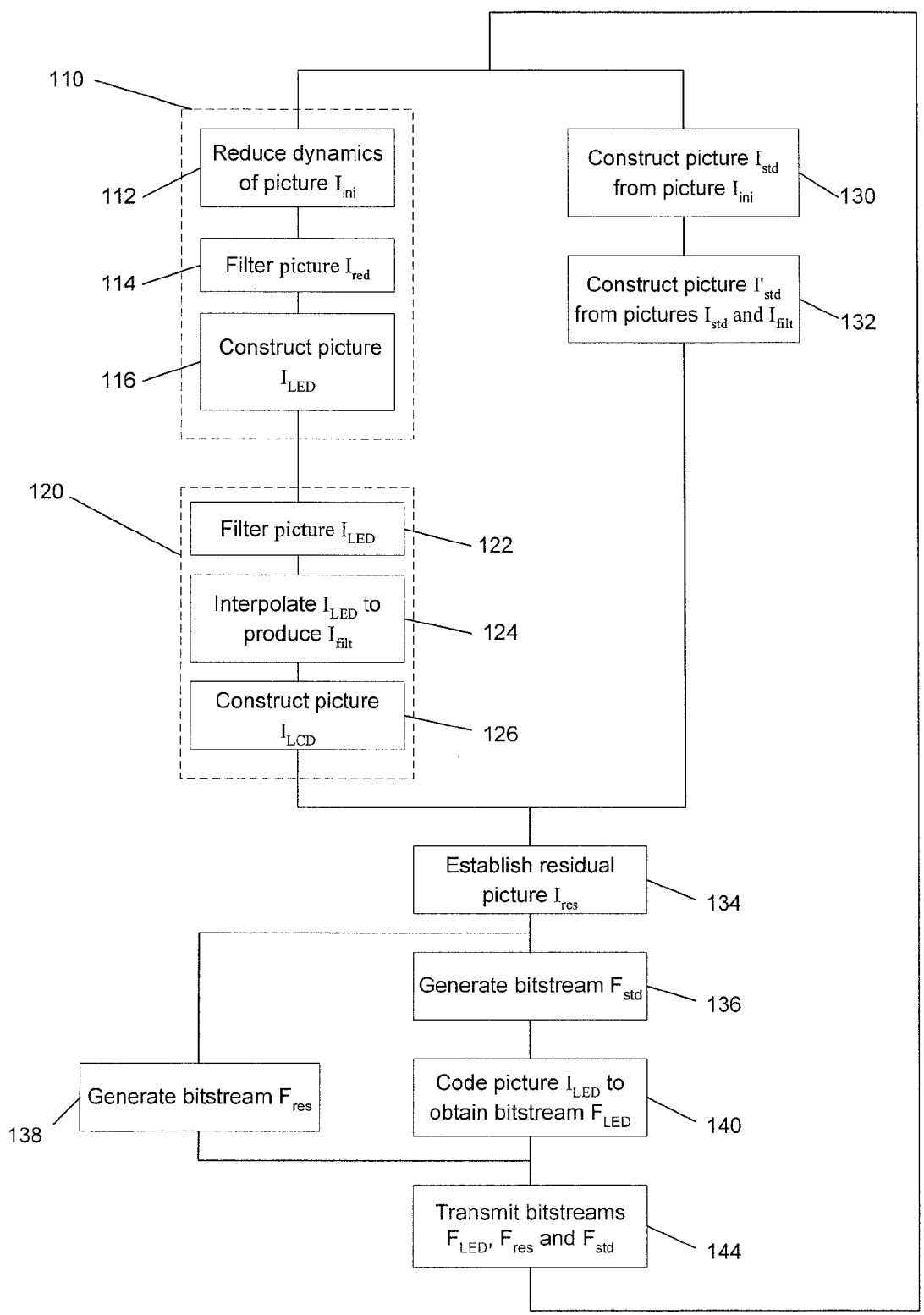
Figure 5:
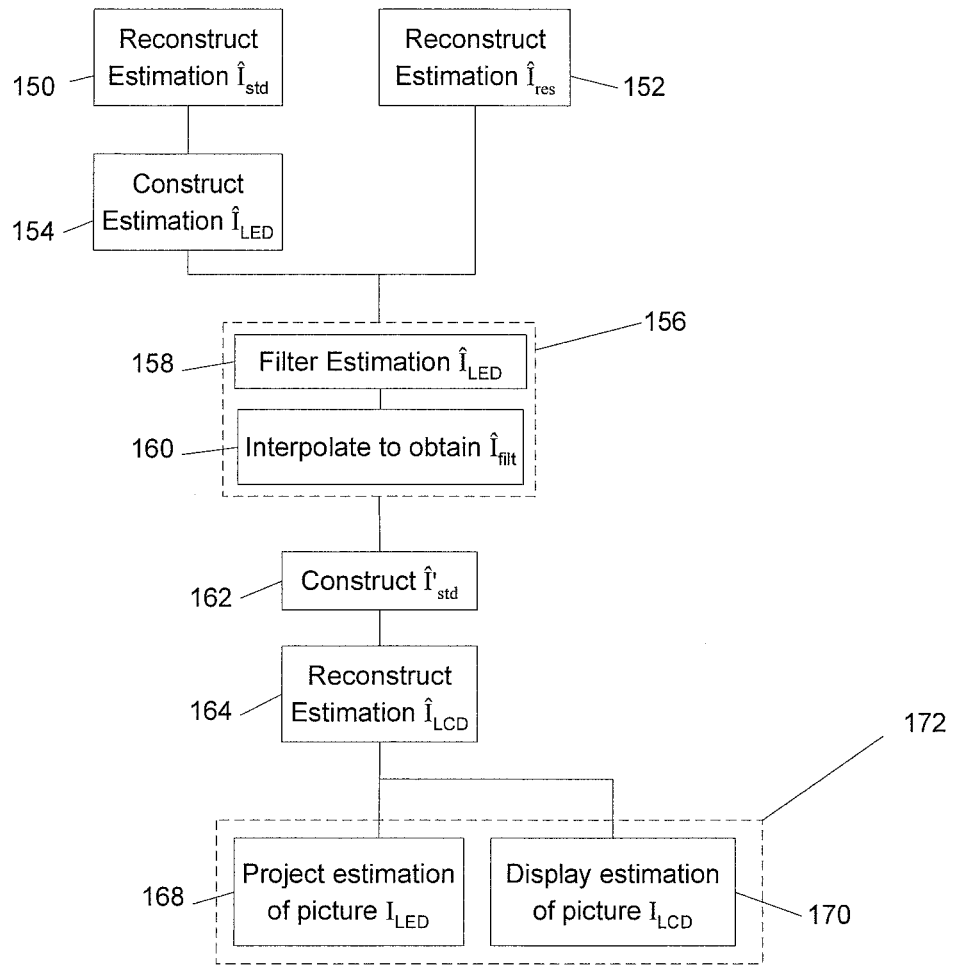
Figure 6:
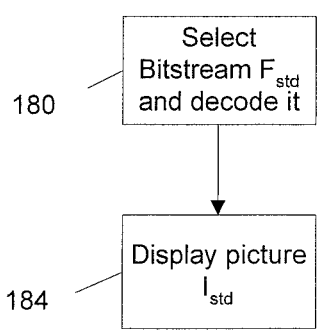

The invention will be better understood upon reading the following description, provided for information only and referring to drawings wherein:

FIG. 1 is a diagrammatic illustration of the architecture of a high dynamic picture transmission system, FIG. 2 is a diagrammatic illustration of the architecture of a coding unit implemented in the system of FIG. 1, FIG. 3 is a schematic illustration of the structure of a decoding unit implemented in the system of FIG. 1, FIG. 4 is a flow chart of a coding method implemented in the system of FIG. 1, FIG. 5 is a flow chart of a decoding method implemented in a high dynamic picture receiver of the system in FIG. 1, and FIG. 6 is, a flow chart of a decoding method implemented in a standard dynamics picture receiver of the system in FIG. 1.

FIG. 1 represents a high dynamic picture transmission system 2 $I_{ini}$.

In the rest of this description, the functions and the characteristics well known buy those skilled in the art are not described in detail.

The system 2 comprises a transmitter 4 of pictures $I_{ini}$ to a large number of picture receivers through an information transmission network 8.

The network 8 is, for example, a radio network or a long distance cable network.

To simplify FIG. 1, only two receivers 10 and 12 were represented.

The transmitter 4 is connected to a source of high dynamic pictures such as those contained on a recording support 14. These pictures $I_{ini}$ are, for example, pictures from a video film.

The transmitter 4 comprises a coding unit 20 able to transform the pictures $I_{ini}$ into three bitstreams $F_{std}$, $F_{res}$ and $F_{LED}$. These streams as well as unit 20 will be described in more detail with respect to FIG. 2.

The unit 20 is here realized using a programmable electronic calculator able to execute recorded instructions on an information recording support. For this purpose, the support 14 comprises the instructions for carrying out the method of FIG. 4 for example, when these instructions are carried out by the programmable calculator.

The receiver 10 is a standard dynamics picture receiver. The receiver 10 comprises a specific decoding unit 22 to transform the bitstream $F_{std}$ into a standard picture $I_{std}$. The picture $I_{std}$ has a standard dynamic which here means, that the luminance of each of the pixels is coded on at most n bits, where n is, for example, less than or equal to eight.

The receiver 10 also comprises a screen 24 to display the picture $I_{std}$. The screen 24 is equipped with a front face on which a pixel matrix is formed. Each pixel can take the level of luminance chosen from among at most $2^n$ possible levels of luminance. The screen 24 is, for example, a CRT (Cathode Ray Tube) screen.

The receiver 12 is a high dynamic picture receiver. The structure of this receiver is, for example, that described in the article A1 previously cited. Hence, only the details necessary to the understanding of the invention are described here.

The receiver 12 comprises a decoding unit 26 able from the bitstreams $F_{LED}$, $F_{res}$ and $F_{std}$ to reconstruct a picture $I_{LED}$ and a picture $I_{LCD}$.

The receiver 12 also comprises a HDR (High Dynamic Range) screen formed here from a projector 28 and a display 30 back-lit by a projector 28. More specifically, the projector 28 is designed to project onto the back of the display 30 the picture $I_{LED}$ while the display 30 is designed to display the picture $I_{LCD}$.

The projector 28 comprises, for example, a controllable grid 34 of LEDs (Light Emitting Diode) and a control unit 36 of the grid 34 in accordance with the picture $I_{LED}$ decoded by the unit 26.

The display 30 is, for example, an LCD (Liquid Crystal Display) comprising an LCD screen 38 controlled by a control unit 40. Unit 40 is able to control the display of the picture $I_{LCD}$ decoded by unit 26.

Unit 26 is described in more detail in respect of FIG. 3.

The unit 26 is typically realized from a conventional programmable electronic calculator able to carry out recorded instructions on an information recording support 42. For this purpose, the support 42 comprises instructions to carry out the method of FIG. 5.

FIG. 2 represents in more detail the coding unit 20. Unit 20 comprises an input 50 to receive pictures $I_{ini}$ and three outputs 52, 53 and 54 respective for the bitstreams $F_{LED}$, $F_{res}$ and $F_{std}$.

Input 50 is connected to a dynamics reducer 56. The reducer 56 reduces the dynamics of the picture $I_{ini}$ by truncating the number of bits required to code the luminance of each pixel.

For example, the reducer 56 carries out the following operation for each pixel:

$$I_{red}(x,y) = \sqrt{I_{ini}(x,y)} \quad (1)$$

where:

$I_{ini}(x,y)$ is the luminance of the pixel at coordinates x,y in the picture $I_{ini}$, and $I_{red}(x,y)$ is the luminance of the pixel at coordinates x,y in the picture $I_{red}$ whose dynamic is reduced.

The picture $I_{red}$ is sent to a sub-sampler 58 followed by a corrector 60. The sub-sampler 58 reduces the resolution (that is the number of pixels) of the picture $I_{red}$ to render it equal to the resolution of the grid of LEDs 34.

The corrector 60 corrects the picture of reduced resolution to compensate the phenomenon of superposition of the neighbouring LED signals. The corrector 60 delivers the picture $I_{LED}$.

The picture $I_{LED}$ is sent to a coder 62 able to generate from the picture $I_{LED}$ and the stream $F_{std}$, the bitstream $F_{LED}$ that is transmitted to all the receivers. The stream $F_{LED}$ codes the picture $I_{LED}$ in accordance with the picture $I_{std}$ coded in the stream $F_{std}$. The correlation between the pictures $I_{LED}$ and $I_{std}$ is then used to compress the stream $F_{LED}$.

The picture $I_{LED}$ is also transmitted to a low-pass filter 64 that allows reconstruction of the picture projected by the grid 34 reproducing the spatial response of each LED from this grid.

The picture generated by the filter 64 is transmitted to an interpolator 66 that generates a picture $I_{filt}$ of the same resolution (that is having the same number of pixels) as the picture $I_{ini}$.

The picture $I_{filt}$ is transmitted to a local quantizer 68 that carries out the following operation for each pixel of the picture:

$$I_{LCD}(x, y) = \frac{I_{ini}(x, y)}{I_{filt}(x, y)} \quad (2)$$

where:
$I_{ini}(x,y)$ is the luminance of the pixel at coordinates x,y in the picture $I_{ini}$,
$I_{filt}(x,y)$ is the luminance of the pixel at coordinates x,y in the picture $I_{filt}$, and
$I_{LCD}(x,y)$ is the luminance of the pixel at coordinates x,y in the picture $I_{LCD}$.

An embodiment of modules 56 to 68 is shown in the article A1.

Unit 20 also comprises a dynamics reducer 70 connected directly to the input 50. The reducer 70 is able to reduce the dynamics of the picture $I_{ini}$ in such a manner as to form the reduced dynamics picture $I_{std}$. For example, the reducer 70 uses for this purpose the following relationship:

$$I_{std}(x,y) = I_{ini}(x,y)/Q \quad (3)$$

where:
$I_{ini}(x,y)$ is the luminance of the pixel at coordinates x,y in the picture $I_{ini}$,
Q is a power of 2 of the form $2^p$, where p is a predetermined whole number,
$I_{std}(x,y)$ is the luminance of the pixel at coordinates x,y in the picture $I_{std}$.

P is here equal to two.

One output of the reducer 70 is connected to the input of a quantizer 72.

Another input of the quantizer 72 receives the picture $I_{filt}$. The purpose of the quantizer 72 is to realize an estimation $I'_{std}$ of the picture $I_{LCD}$. For this purpose the quantizer 72 implements the following operation for example:

$$I'_{std}(x, y) = \frac{I_{std}(x, y) * Q}{I_{filt}(x, y)} \quad (4)$$

where $F'_{std}(x,y)$ is the luminance of the pixel at coordinates x,y in the picture $I'_{std}$.

The quantizer outputs 72 and 68 are connected to the respective inputs of a subtractor 74. The subtractor 74 subtracts from the luminance of each pixel of the picture $I_{LCD}$, the luminance of the corresponding pixel in the picture $I'_{std}$. The result of this subtraction is noted as $I_{res}$.

An output of subtractor 74 is connected to an input of a coder 76 that generates from the picture $I_{res}$ the bitstream $F_{res}$.

Finally, unit 20 comprises a coder 78 connected to an output of a reducer 70 and able to generate the bitstream $F_{std}$ from the picture $I_{std}$ generated by the reducer 70.

The coders 62, 76 and 78 are able to generate bitstreams conforming to the standards imposed for the transmission of audiovisual or multimedia signals. For example, a coding by bit plane conforming to the standard JPEG 2000 can be considered.

Preferably, the coder 78 generates a stream $F_{std}$ that requires no particular processing from the receiver 10 in respect of the processing that this receiver 10 carries out to display a standard dynamics picture.

Here, preferably, the coder 78 is identical to that used in a standard transmitter able to transmit only standard dynamics pictures. Hence, the bitstream $F_{std}$ is decodable by all standard receivers able to display pictures coded in the bitstream generated by the standard transmitter without it being necessary to modify these standard receivers.

FIG. 3 represents in more detail the decoding unit 26 of the receiver 12.

Unit 26 comprises three inputs 82, 84 and 86 to receive respectively the bitstreams $F_{LED}$, $F_{std}$ and $F_{res}$.

Unit 26 also comprises two outputs 88 and 90 to transmit respectively the picture $\hat{I}_{LED}$ and a picture $\hat{I}_{LCD}$. $\hat{I}_{LED}$ and $\hat{I}_{LCD}$ corresponding respectively to the picture estimations $I_{LED}$ and $I_{LCD}$ constructed from the bitstreams $F_{LED}$, $F_{std}$ and $F_{res}$.

Unit 26 comprises three decoders 92, 94 and 96 connected respectively to inputs 82, 84 and 86.

The decoder 96 generates an estimation $\hat{I}_{res}$ of the residual picture $I_{res}$ only from the bitstream $F_{res}$.

Unit 94 generates an estimation $\hat{I}_{std}$ of the picture $I_{std}$ only from the bitstream $F_{std}$.

Finally, the decoder 92 generates the estimation $\hat{I}_{LED}$ from the bitstream $F_{LED}$ and taking into account information transmitted by the decoder 94.

The output of the decoder 92 is connected to the output 88. The output of decoder 92 is also connected to the input of a low-pass filter 98 for which the output is connected to the input of an interpolator 100. The low-pass filter 98 and the interpolator 100 are respectively identical to the low-pass filter 64 and the interpolator 66. Hence, one of the outputs of interpolator 100 generates an estimation $\hat{I}_{filt}$ of the picture $I_{filt}$.

Unit 26 also comprises a quantizer 102 connected to the output of the interpolator 100 and the output of the decoder 94. The quantizer 102 is identical to the quantizer 72 for example.

Hence, at the output, the quantizer 102 generates an estimation $\hat{I}_{std}$ of the picture $I'_{std}$.

Unit 26 comprises an adder 104 specifically to add the luminance of each pixel of the estimation $\hat{I}_{res}$ to the luminance of each corresponding pixel from the estimation $\hat{I}'_{std}$. The result of this sum forms the estimation $\hat{I}_{LCD}$ supplied by the output 90.

The operation of the coding unit 20 will now be described in more detail with respect to the method of FIG. 4.

Initially, during a phase 110, the picture $I_{LED}$ is constructed.

During this phase 110, in stage 112, the reducer 56 reduces the dynamics of the picture $I_{ini}$.

Then, during stage 114, the reduced dynamic picture $I_{red}$ is filtered, during a stage 116, by the filter 58 then corrected by the corrector 60 in order to construct the picture $I_{LED}$.

Once the picture $I_{LED}$ has been constructed, during a phase 120, the picture $I_{LCD}$ is constructed, during a phase 120.

During this phase 120, the picture $I_{LED}$ is filtered, in a stage 122, by the filter 64 then the result of this filtering is interpolated, in a stage 124, by the interpolator 66 in order to obtain the picture $I_{filt}$. Finally, during stage 126, the picture $I_{LCD}$ is constructed by a quantizer 68.

The phases 110 and 120 are described in more detail in the A1 article.

In parallel with phases 110 and 120, in stage 130, the reducer 70 constructs the picture $I_{std}$ from the picture $I_{ini}$. After the quantizer 72 constructs the picture $I'_{std}$ from the pictures $I_{std}$ and $I_{filt}$, during a stage 132.

At the end of the phase 120 and of stage 132, during stage 134, the subtractor 74 establishes the residual picture $I_{res}$.

In parallel, during stages 136 and 138, the coders 78 and 76 respectively generate the bitstreams $F_{std}$ and $F_{res}$.

During stage 140, the coding of the picture $I_{LED}$ to obtain the bitstream $F_{LED}$ is realized taking into account the coding of the bitstream $F_{std}$ in such a way to limit the redundancy of the streams $F_{std}$ and $F_{LED}$. Hence, the bitstreams transmitted are compressed.

At the end of stages 138, 136 and 140, during stage 144, the bitstreams $F_{LED}$, $F_{res}$ and $F_{std}$ are transmitted via the network 8 to the set of receivers of system 2.

At the end of stage 144, the method returns to phase 110 and stage 130 to code the succeeding pictures.

The operation of the coding unit 26 will now be described with respect to the method of FIG. 5.

Unit 26 receives the bitstreams $F_{LED}$, $F_{std}$ and $F_{res}$.

Then, the decoder 94 reconstructs the estimation $\hat{I}_{std}$ in stage 150. In parallel, during stage 152, the decoder 94 constructs the estimation $\hat{I}_{res}$.

The estimation $\hat{I}_{LED}$ is constructed by the decoder 92, during stage 154 taking into account information on the decoding of the bitstream $F_{std}$.

During a stage 156, the estimation $\hat{I}_{filt}$ of the picture $I_{filt}$ is constructed. More precisely, during an operation 158, the filter 98 filters the estimation $\hat{I}_{LED}$ then, during an operation 160, the result of operation 158 is interpolated in such a way to obtain the estimation $\hat{I}_{filt}$. After stage 156, during stage 162, the estimation $\hat{I}'_{std}$ is constructed from estimations $\hat{I}_{std}$ and $\hat{I}_{filt}$. Stage 162 is, for example, identical to stage 132.

During stage 164, the estimation $\hat{I}_{LCD}$ is reconstructed from estimations $\hat{I}_{res}$ and $\hat{I}'_{std}$. Stage 164 is realized by the summator 104.

The estimation $\hat{I}_{LED}$ is then used during a stage 168 to control the projector 28. More precisely, during this stage 168, the projector 28 projects the estimation of the picture $I_{LED}$ onto the back of the display 30. In parallel, during a stage 170, the estimation of the picture $I_{LCD}$ is displayed by the display 30.

The luminance of a pixel displayed by the receiver 12 is therefore the combination of the luminance values of the grid LEDs 34 and the pixel of screen 38 being located on the same beam path. Hence, the execution of stages 168 and 170 forms a stage 172 of reconstruction of the luminance of the picture $I_{ini}$.

The operation of the receiver 10 will now be described in respect of the method of FIG. 6.

During stage 180, the unit 22 selects the bitstream $F_{std}$ and decodes it to obtain the picture $I_{std}$.

During stage 184, the screen 24 is commanded to display the picture $I_{std}$. No reduction of the dynamics of the picture received is necessary at the level of receiver 10.

The invention claimed is:

1. A coding unit suitable to generate bitstreams coding high dynamic range digital pictures in which a luminance level of each pixel is coded on m bits, m being a whole number greater than or equal to ten, wherein the coding unit is able to generate:
a standard bitstream coding pictures of standard dynamic range $I_{std}$ obtained from the high dynamic range digital pictures in which the luminance level of each pixel of each standard dynamic range picture is uniquely coded on at most n bits, where n is a whole number strictly less than m,
a residual bitstream coding only a difference in luminance levels between each said pixel of a picture $I_{LCD}$ and each corresponding pixel of a picture estimation $I_{std}$ of said picture $I_{LCD}$ obtained from the pictures of said standard dynamic range $I_{std}$, the picture $I_{LCD}$ being the picture displayed by an LCD (Liquid Crystal Display) back-lit by a projector of pictures projecting a picture $I_{LED}$; and
a third bitstream coding pictures $I_{LED}$ in respect of the standard bitstream, the pictures $I_{LED}$ being those projected by a picture projector used to back-light an LCD (Liquid Crystal Display) displaying a picture $I_{LCD}$.

2. A decoding unit of high dynamic range digital pictures wherein a luminance level of each pixel is coded on m bits, m being a whole number greater than or equal to ten, wherein the decoding unit comprises:
a unit configured to reconstruct pictures $I_{STD}$ of standard dynamic range from a standard bitstream, wherein the luminance level of each said pixel of each said picture of standard dynamic range is uniquely coded on at most n bits, where n is a whole number strictly less than m;
a unit configured to reconstruct pictures $I_{LCD}$ from a residual bitstream and picture estimations $I_{std}$ obtained from the pictures of standard dynamic range $I_{std}$, the residual bitstream coding only the difference in luminance levels between each said pixel of a picture $I_{LCD}$ and each corresponding pixel of the picture estimation $I_{std}$, the picture $I_{LCD}$ being the picture displayed by an LCD (Liquid Crystal Display) display back-lit by a picture projector projecting a picture $I_{LED}$; and
a unit configured to reconstruct pictures $I_{LED}$ from the standard bitstream and a third bitstream coding pictures $I_{LED}$ in respect of the standard bitstream, the pictures $I_{LED}$ being those projected by a picture projector used to back-light an LCD (Liquid Crystal Display) displaying the pictures $I_{LCD}$.

3. A coding method of a high dynamic range digital picture in which a luminance level of each pixel is coded on m bits, m being a whole number greater than or equal to ten, wherein the method comprises:
generating a standard bitstream coding pictures of standard dynamic range $I_{std}$ obtained from the high dynamic range pictures in which the luminance level of each pixel of each standard dynamic range picture is uniquely coded on at most n bits, where n is a whole number strictly less than m,
generating a residual bitstream coding only the difference in luminance levels between each pixel of a picture $I_{LCD}$ and each corresponding pixel of a picture estimation $I_{STD}$ of said picture $I_{LCD}$ obtained from the pictures of standard dynamic range $I_{std}$, the picture $I_{LCD}$ being the picture displayed by an LCD (Liquid Crystal Display) back-lit by a projector of pictures projecting a picture $I_{LED}$; and
a third bitstream coding pictures $I_{LED}$ in respect of the standard bitstream, the pictures $I_{LED}$ being the pictures projected by a picture projector used to back-light a liquid crystal display, displaying the pictures $I_{LCD}$.

4. A coding method according to claim 3, wherein pictures $I_{LCD}$ are obtained from pictures of high dynamic range by:
reducing the dynamics of the pictures of high dynamic range so as to obtain pictures of reduced dynamic range;
sub-sampling the pictures of reduced dynamic range;
correcting the sub-sampled pictures in order to construct the pictures $I_{LED}$;

low pass filtering the picture $I_{LED}$ into low-pass filtered pictures;

interpolating the low-pass filtered pictures; and quantizing the low-pass filtered pictures so as to obtain the pictures $I_{LCD}$.

5. A coding method according to claim 3, wherein pictures $I_{LED}$ are obtained from pictures of high dynamic range by:

reducing the dynamics of the pictures of high dynamic range so as to obtain pictures of reduced dynamic range;

sub-sampling the pictures of reduced dynamic range; and correcting the sub-sampled pictures in order to obtain the pictures $I_{LED}$.

6. A coding method according to claim 3, wherein the picture estimations $I_{std}$ are obtained by quantizing the pictures of standard dynamic range.

7. A decoding method of a high dynamic initial digital picture wherein a luminance level of each pixel is coded on m bits, m being a whole number greater than or equal to ten, comprising reconstructing of the luminance coded on m bits of each pixel of each initial picture from:

reconstructing pictures $I_{STD}$ of standard dynamic range from a standard bitstream, wherein the luminance level of each pixel of each picture of standard dynamic range is uniquely coded on at most n bits, where n is a whole number strictly less than m;

reconstructing pictures $I_{LCD}$ from a residual bitstream and pictures estimation $I_{STD}$ obtained from the pictures of standard dynamic range $I_{STD}$, the residual bitstream coding only the difference in luminance levels between each pixel of a picture $I_{LCD}$ and each corresponding pixel of the picture estimation $I_{STD}$, the picture $I_{LCD}$ being the picture displayed by a liquid crystal display back-lit by a picture projector projecting a picture $I_{LED}$;

reconstructing a picture $I_{LED}$ from the standard bitstream and a third bitstream coding pictures $I_{LED}$ in respect of the standard bitstream, the pictures $I_{LED}$ being those projected by a picture projector used to back-light a liquid crystal display, displaying the pictures $I_{LCD}$.

* * * * *